UNITED STATES PATENT OFFICE.

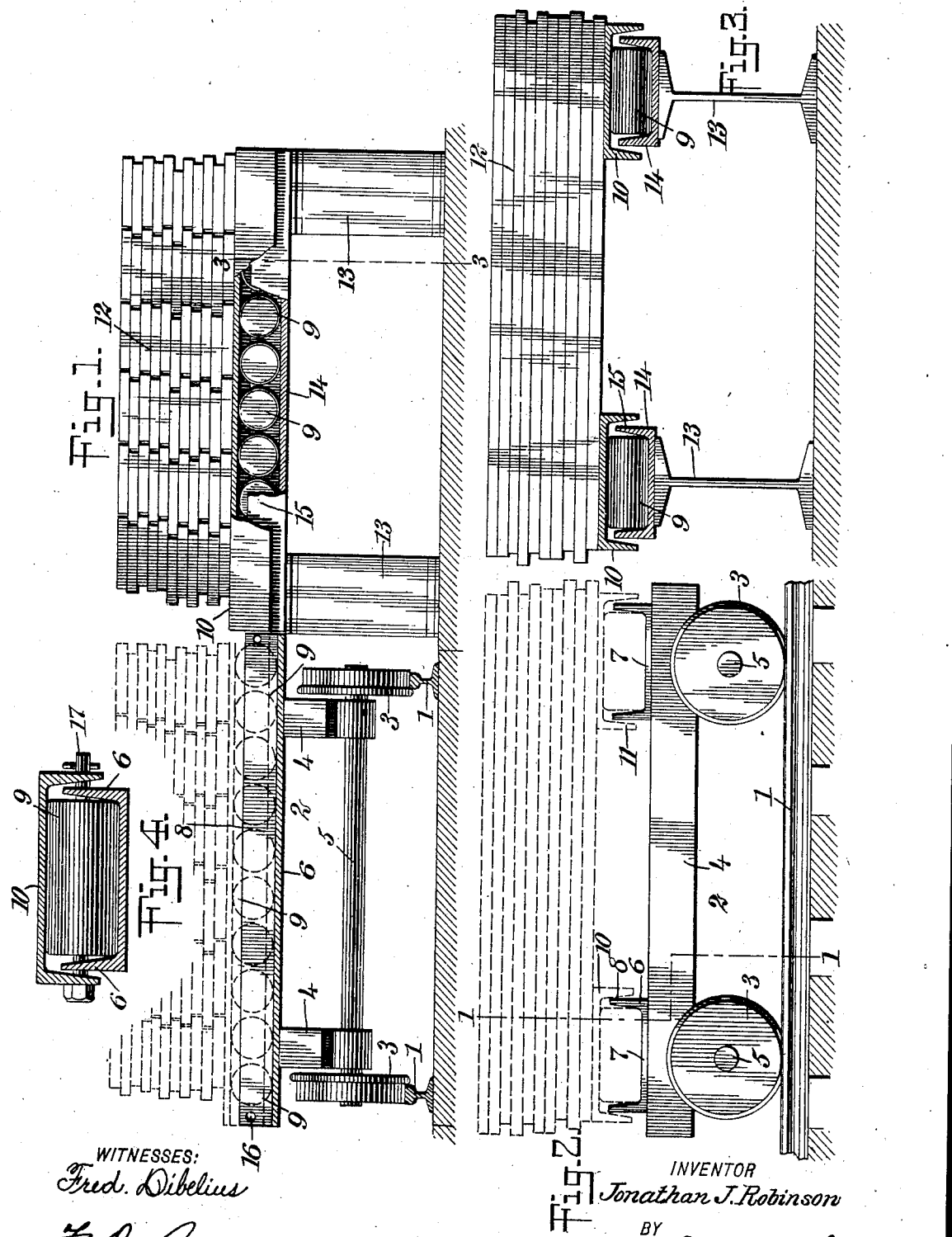

JONATHAN J. ROBINSON, OF BLOOMSBURG, PENNSYLVANIA.

LOADING APPARATUS.

No. 833,139.　　　　Specification of Letters Patent.　　　　Patented Oct. 9, 1906.

Application filed January 23, 1906. Serial No. 297,393.

*To all whom it may concern:*

Be it known that I, JONATHAN J. ROBINSON, a citizen of the United States, and a resident of Bloomsburg, in the county of Columbia and State of Pennsylvania, have invented a new and Improved Loading Apparatus, of which the following is a full, clear, and exact description.

This invention relates to the loading and unloading of trucks used for transporting goods.

The invention is especially applicable in shops and mills for the purpose of facilitating the moving of loads of material in bulk.

The object of the invention is to produce a construction of truck and platform for the load which will facilitate the moving of the load from the truck to the platform, or vice versa.

More specifically, the object of the invention is to enable the transfer to be made without breaking the bulk and to provide such construction as will reduce the force necessary for effecting the transfer.

The invention consists in the construction and combination of parts to be more fully described hereinafter, and particularly set forth in the claims.

Reference is to be had to the accompanying drawings, forming a part of this specification, in which similar characters of reference indicate corresponding parts in all the figures.

Figure 1 is a transverse section through a truck constructed according to my invention and representing the same as alined with a receiving-platform to which the load has been transferred. A portion of this platform is represented as broken away, and the section of the truck is taken substantially on the line 1 1 of Fig. 2. Fig. 2 is a side elevation of the truck shown in Fig. 1. Fig. 3 is a vertical section through the receiving-platform, taken on the line 3 3 of Fig. 1; and Fig. 4 is a vertical section through a portion of the truck and showing details of the construction.

Before proceeding to a detailed description of the apparatus it may facilitate the disclosure to state that the application of the invention about to be described contemplates an arrangement employing a track upon which the truck runs. Such tracks are in common use in factories, running between the piles of material or to and from machines which treat the material. While in the specification and drawings I have illustrated a truck which runs upon rails, it should be understood that this arrangement is adopted to facilitate the loading and unloading operation, and while it is advantageous it is not essential.

Referring more particularly to the parts, 1 represents the rails of the track upon which a truck 2 runs, the same being mounted upon suitable wheels 3. In its construction this truck presents a pair of opposite beams 4, which are supported upon the axles 5 of the wheels 3. These beams are connected near their extremities by transverse channels 6, which are laid with their webs 7 flat upon the beams and their flanges 8 projecting upwardly, as shown. Before the load is placed upon this truck in the channels 6 I place a plurality of rollers 9 of common form. These may be simply formed of wood. They project, as shown, above the upper edges of the flanges 8, and upon them I lay rests 10, which are also of channel form, larger than the channels 6 and arranged in an inverted position, as shown, with their flanges 11 projecting downwardly. Upon the rests 10 the load 12 is placed, and this load may be a pile of lumber, as indicated. This load, the rests, and the rollers are indicated in dotted lines above the truck in Figs. 1 and 2.

At a suitable point at the side of the track I provide supports, such as the short I-beams 13, (shown in Fig. 3,) upon which skids 14 are placed, as shown, said skids being preferably of channel form having flanges 15, which project upwardly, as indicated. These supports 13 and skids 14 constitute a rudimentary platform to receive the load. The skids 14 are preferably of substantially the same dimensions and form as the channel 6 aforesaid. They are arranged at the same height therewith and the same distance apart, so that when the truck is moved opposite them the channels 6 will aline substantially with the channels 14. In loading or unloading the truck is brought into this position. In Fig. 1 the load is represented as having been moved from the truck. In order to accomplish this after the truck is brought into alinement with the platform, as suggested, the workmen push the load toward the platform. In this way the load is rolled upon the rollers 9, so as to advance the rests 10 into position over the channels 14. As the operation progresses other rollers are inserted ahead of the rollers under the load, so that the rests 10 will eventually come into the position shown in Fig. 1. In this way the load is moved in bulk from the truck to the platform. After having been moved the outside rollers will be suitably chocked, in a well-known manner, with blocks of wood or similar means to prevent the accidental displacement of the load.

In order to prevent any movement of the load laterally of the truck when the same is passing along the track, I provide alining openings 16 in the flanges of the channels 6 and the rests 10, and through these openings a bolt 17 is passed at each end, as indicated most clearly in Fig. 4. In this way the rests are locked to the channels and the truck. Before attempting to transfer the load of course these bolts 17 must be removed.

While I prefer to use channels, as described, for directing the rollers in skidding the load from the truck to the platform, or vice versa, it should be understood that these channels simply operate as guides. The operation of moving the load from the platform to the truck is of course substantially the same as that in moving the load to the platform, except that the load moves in a reverse direction.

Having thus described my invention, I claim as new and desire to secure by Letters Patent—

1. In apparatus of the class described, in combination, a truck having transverse guides, rollers running in said guides, and a platform at substantially the level of said guides and adapted to receive the rollers therefrom.

2. In apparatus of the class described, in combination, a truck having transverse guides, rollers running in said guides and adapted to support the load, and other guides suitably supported and adapted to aline with said first guides to receive said rollers and the load therefrom.

3. In apparatus of the class described, in combination, a pair of substantially parallel skids, means for supporting the same, a truck having transverse guides adapted to aline with said skids, rollers running in said guides, and rests lying on said rollers and adapted to support the load.

4. In apparatus of the class described, in combination, a truck having transverse channels with their flanges projecting upwardly, rollers disposed in said channels, rests lying on said rollers and having downwardly-projecting flanges, and means for fixing the flanges of said rests to the flanges of said channels.

5. In apparatus of the class described, in combination, a truck having transverse channels with their flanges disposed upwardly, rollers running in said channels, rests of substantially channel form lying on said rollers and having flanges projecting downwardly, the flanges of said rests and channels having alining openings therein, and removable bolts passing through said openings and affording means for retaining said rollers.

In testimony whereof I have signed my name to this specification in the presence of two subscribing witnesses.

JONATHAN J. ROBINSON.

Witnesses:
F. D. AMMEN,
JNO. M. RITTER.